United States Patent Office 2,921,410
Patented Jan. 19, 1960

2,921,410

COTTON SEED TREATMENT AND COMPOSITION, USING GIBBERELLIN AND FUNGICIDE

James M. Merritt, Mountainside, N.J., assignor to Merck & Co., Inc., Rahway, N.J., a corporation of New Jersey No Drawing. Application December 11, 1957
Serial No. 701,969

6 Claims. (Cl. 47—58)

This invention relates to the treating of seeds and to compositions useful for treating seeds. More particularly, this invention is concerned with a composition for, and method of, treating seeds so that there is a greater number of seedlings resulting from a planting of seeds so treated, in comparison with the number of seedlings resulting from a planting of seeds not so treated.

The treatment of seeds in any manner, particularly when coated in any manner, has a tendency to decrease the number of seedlings resulting from planting of such treated seed, in comparison with the number of seedlings resulting from untreated seeds.

However, it is recognized that it is commonly desirable to treat seeds—as with a fungicide for example—in order to protect the seed and seedling when planted in an area where damage by soil-borne fungi to the seed and seedling may be significant when not so treated. The number of seedlings resulting from the planting of such fungicide-treated seeds is usually less than the number of seedlings resulting from untreated seeds where the untreated seeds are planted in essentially fungus-free ground, but is appreciably greater than the number of seedlings resulting when untreated seeds are planted in ground containing fungi in any significant quantity.

The treatment of seeds with "gibberellin" is a relatively recent development, the objective being to increase the speed of germination and the rate of initial growth of the resulting seedlings. Such a treatment has, with many seeds, the same tendency as have other seed treatments with respect to the number of seedlings resulting from the planting of a given number of seeds (i.e. a smaller number of seedlings result), in comparison with the number of seedlings resulting from untreated seeds.

In accordance with my invention, I treat seeds with "gibberellin" and a fungicide having certain characteristics. The result is not, as one might expect, that the number of seedlings produced is less than the number of seedlings resulting from seeds treated with the fungicide alone, but is a number of seedlings in excess of the number of seedlings resulting from seeds treated with the fungicide alone, and usually is a number of seedlings in excess even of the number of seedlings resulting from untreated seeds. Thus, the benefits of the fungicidal treatment are obtainable, with my invention, with less diminution of the number of resulting seedlings, and usually even with an increase in the number of resulting seedlings over the number resulting when the seeds are untreated.

The term "gibberellin" is used in the generic sense to embrace gibberellin A, gibberellic acid (also identified in the literature as gibberellin X), and related substances having growth stimulating hormonal activity, which are obtained from fermentation broth produced in fermentation of nutrient media with the organism *Gibberella fujikuroi* under aerobic submerged conditions. Procedures for preparing gibberellin, and gibberellin A in particular, were first developed in Japan and were reported in Chemical Abstracts (10814–10818, 1950). More recently English workers have reported in J. Chem. Soc. (London), p. 4670, 1954, and in Chemistry & Industry, p. 1066, 1954, the preparation of gibberellic acid (gibberellin X); and Stodola et al. in the United States have reported, Arch. Biochem. and Biophys. 54, 240 (1955), the preparation by fermentation of mixtures of gibberellin A and gibberellin X and the recovery of gibberellin A and gibberellin X separately therefrom.

A specific "gibberellin" that has been found particularly effective in my invention is potassium gibberellate, which has the empirical formula $C_{19}H_{21}O_6K$, an optical rotation (in 5 percent aqueous solution) of $+50°$, and an ultra violet absorption $A_{1\ cm.}^{1\%}$, of 18.8 at 257 m$\mu$ and pH 9

The infra-red absorption of such solid potassium gibberellate in Nujol has absorption bands at the following wavelengths:

(There is a broadened region in the vicinity of 3.3 microns.)

| | |
|---|---|
| 5.69 | 9.32 |
| 5.82 | 9.52 |
| 6.28 | 9.78 |
| 6.70 | 10.01 |
| 7.10 | 10.28 |
| 7.23 | 10.45 (shoulder) |
| 7.30 (shoulder) | 10.70 |
| 7.50 | 10.83 |
| 7.63 | 11.22 |
| 7.81 | 11.53 |
| 7.93 | 12.07 |
| 8.11 | 12.25 |
| 8.22 | 12.83 (shoulder) |
| 8.47 | 12.98 |
| 8.52 | 13.40 |
| 8.78 | 13.80 |
| 9.01 | |

The fungicide that I presently prefer to use in my invention is zinc trichlonophenate, at least when the seeds treated are cotton seeds.

My invention is specifically illustrated by the following examples:

EXAMPLE I

The seed used for this test was acid-delinted cotton seed of the Deltapine 15 variety, harvested in the fall of 1956. Four two-pound lots of such seed were washed in water in the same manner to remove all coating material which may have been applied to the seed by others before the commencement of this test. The washed seed was then air dried.

One lot of the washed and dried seeds was designated seed lot No. 1. There was no further treatment of this seed lot, so that it constituted untreated seeds. These seeds were placed in an appropriately marked bag.

Another seed lot, designated seed lot No. 2, was treated to coat the seeds with the fungicide zinc trichlorophenate.

The zinc trichlorophenate used was a dry mixture in which the active ingredient zinc trichlorophenate constitued 32% by weight and inert ingredients constituted 68% by weight. Such a composition is available from the Dow Chemical Company as the "Dow 9–B" fungicide and seed protectant for cotton seed. The active ingredient is zinc 2,4,5-trichlorophenate.

1.7 grams of such dry mixture was placed in a beaker and about 5 cc. of distilled water was added to the beaker and the contents stirred.

The seeds of seed lot No. 2 were placed in a wide-mouthed gallon bottle and the contents of the beaker emptied into the bottle over the seeds. The bottle was then shaken and rolled until the seeds were evenly coated with the mixture, after which the seeds were poured from the bottle onto a paper and air dried for about ten minutes. The seeds were then placed in an appropriately marked bag.

The fungicide coating on the seeds of seed lot No. 2 was equivalent to a coating of 3 ounces of the composition per 100 pounds of seed, or about 27 grams of zinc trichlorophenate per 100 pounds of seed.

Another seed lot, designated seed lot No. 3, was treated to coat the seeds with potassium gibberellate.

The potassium gibberellate used was a dry mixture in which the potassium gibberellate constituted 0.88% by weight and inert ingredients constituted 99.12% by weight. Such a composition is available from Merck & Co., Inc., as the "Gibrel" brand of gibberellin plant growth substance seed stimulant.

2.28 grams of such dry mixture was placed in a beaker and about 5 cc. of distilled water was added to the beaker and the contents stirred.

The seeds of seed lot No. 3 were placed in a wide mouthed gallon bottle and the contents of the beaker emptied into the bottle over the seeds. The bottle was then shaken and rolled until the seeds were evenly-coated with the mixture, after which the seeds were poured from the bottle onto paper and air dried for about ten minutes. The seeds were then placed in an appropriately marked bag.

The gibberellin coating on the seeds of seed lot No. 3 was equivalent to a coating of 4 ounces of the composition per 100 pounds of seed, or 1 gram of potassium gibberellate per 100 pounds of seed.

The final seed lot, designated seed lot No. 4, was treated to coat the seeds with both the fungicide zinc trichlorophenate and potassium gibberellate.

The zinc trichlorophenate was a dry mixture identical to that used for coating seed lot No. 2, and the potassium gibberellate was a dry mixture identical to that used for coating seed lot No. 3. The same quantity of the zinc trichlorophenate dry mixture as for seed lot No. 2 was placed in a beaker, and then the same quantity of the potassium gibberellate dry mixture as for seed lot No. 3 was placed in that same beaker, and the two dry mixtures stirred. The contents of this beaker constituted a dry premix for use in the treating cotton seed. About 10 cc. of distilled water was then added to the beaker and the contents stirred again.

The seeds of seed lot No. 4 were placed in a wide-mouthed gallon bottle and the contents of the beaker emptied into the bottle over the seeds. The bottle was then shaken and rolled until the seeds were evenly coated with the mixture, after which the seeds were poured from the bottle onto paper and air dried for about ten minutes. The seeds were then placed in an appropriately marked bag.

The coating on the seeds of seed lot No. 4 was equivalent to a coating of about 27 grams of zinc trichlorophenate and 1 gram of potassium gibberellate per 100 pounds of seed.

Seeds of each lot were field planted, using a standard seed planter mounted on the back of a tractor. Each lot of seeds was planted in four different rows in the field test plot, each row being 60 feet long and the rows approximately 4 feet apart. At the start of each row, and while the seed planter was stationary, the hopper of the seed planter was filled with seed from the appropriate bag. The planter was then moved along the row for 60 feet, during which operation the seed was planted by the planter. At the end of the row the planter was stopped and the seeds remaining in the hopper emptied back into the bag from which they came.

The field test plot was in an area favorable to the growth of cotton and the daily average temperature over the test period of 23 days after planting ranged from 71° to 83° F. and the precipitation and sunshine over the test period was about normal.

The number of seedlings resulting from the seeds planted in each row was counted for three 10-feet segments of each row. The segments chosen on the day of the first count as typical of the row remained unchanged throughout the rest of the test period. The aggregate number of seedlings resulting from the planting of any one seed lot of seeds was thus the sum of the seedlings in twelve 10 foot segments, distributed over four different rows of 60 feet each.

The number of seedlings were counted each day from the fourth through the fourteenth day after planting, and then on the twenty-third day after planting.

The results of this test are set forth in Table I.

*Table 1*

NUMBER OF COTTON SEEDLINGS

| Days after Planting | Untreated Seeds (Seed Lot No. 1) | Seeds treated with Zinc trichlorophenate only (Seed Lot No. 2) | Seeds treated with Potassium Gibberellate only (Seed Lot No. 3) | Seeds treated with Zinc trichlorophenate and Potassium Gibberellate (Seed Lot No. 4) |
| --- | --- | --- | --- | --- |
| 4 | 151 | 73 | 71 | 336 |
| 5 | 530 | 292 | 230 | 935 |
| 6 | 882 | 539 | 433 | 1,335 |
| 7 | 1,114 | 715 | 546 | 1,480 |
| 8 | 1,180 | 788 | 552 | 1,550 |
| 9 | 1,221 | 813 | 558 | 1,552 |
| 10 | 1,260 | 816 | 563 | 1,536 |
| 11 | 1,333 | 881 | 566 | 1,532 |
| 12 | 1,365 | 847 | 561 | 1,472 |
| 13 | 1,251 | 826 | 549 | 1,460 |
| 14 | 1,274 | 843 | 548 | 1,490 |
| 23 | 1,278 | 845 | 556 | 1,488 |

From the above Table I it is evident that the coating of those seeds with zinc trichlorophenate decreased the number of resulting seedlings present 23 days after planting, in comparison with the number of seedlings resulting from uncoated seeds, the number of first mentioned seedlings being 845 and the number of the second mentioned seedlings being 1278.

It is also evident from Table I that the coating of those seeds with potassium gibberellate also decreased the number of resulting seedlings present 23 days after planting, in comparison with the number of seedlings resulting from uncoated seeds; the number of the first mentioned seedlings being 556 and the number of the second mentioned seedlings being 1278.

Finally, it is evident from Table I that the coating of those seeds with both zinc trichlorophenate and potassium gibberellate increased the number of resulting seedlings present 23 days after planting, in comparison with the number of seedlings resulting from seeds coated with zinc trichlorophenate, the number of the first mentioned seedlings being 1488 and the number of the second mentioned seedlings being 845. In fact, it is evident from Table I that the coating of those seeds with both zinc trichlorophenate and potassium gibberellate increased the number of resulting seedlings present 23 days after planting over the number of seedlings resulting from uncoated seeds, the number of the first mentioned seedlings being 1488 and the number of the second mentioned seedlings being 1278.

EXAMPLE II 16 unused seeds from seed lot No. 1 of Example I and 16 unused seeds from seed lot No. 4 of Example I were planted in 4 boxes in groups of 4 untreated seeds and 4 treated seeds to each box.

The boxes were maintained at a temperature of about 82° F. and exposed to artificial light 24 hours a day.

In no case did 4 seedlings result from the untreated seeds in any box. In every case 4 seedlings resulted from the treated seeds in each box.

The following Table II sets forth the results of this test:

Table II

| Box No. | Untreated Seeds Planted | Number of Seedlings Resulting from Untreated seeds | Treated Seeds Planted | Number of Seedlings Resulting from Treated seeds |
|---|---|---|---|---|
| 1 | 4 | 3 (including 1 dwarf). | 4 | 4 (including 1 dwarf). |
| 2 | 4 | 2 | 4 | 4. |
| 3 | 4 | 3 (including 1 dwarf). | 4 | 4. |
| 4 | 4 | 3 (including 1 dwarf). | 4 | 4. |

EXAMPLE III

Another dry premix containing both zinc trichlorophenate and potassium gibberellate for use in treating seed, is prepared as described below, using the following materials in the amounts indicated:

| | Grams |
|---|---|
| Zinc trichlorophenate (technical) (containing about 57.5% pure zinc trichlorophenate) | 56.00 |
| Potassium gibberellate | 1.18 |
| Calcium silicate, synthetic (Micro-Cel 1B from Johns-Manville Co.) | 29.82 |
| Starch (corn) | 10.00 |
| Dispersing agent (Polyoxyethylene sorbitan monolaurate, available as Tween 20) | 2.00 |
| Dye, ferric oxide | 1.00 |
| Methyl alcohol, 15 cc. (not included in weight total.) | |
| Total dry weight | 100.00 |

The potassium gibberellate is dissolved in the methyl alcohol, to which is then added the dispersing agent. The solution is sprayed onto the calcium silicate, after which the alcohol is evaporated, keeping the temperature below about 130° F. The remaining dry ingredients (i.e. zinc trichlorophenate, starch and dye) are added and the mixture blended until thoroughly mixed.

To treat two pounds of seed to produce an effect on the number of resulting seedlings similar to the effect produced by the dry premix used for seed lot No. 4 of Example I, 1.7 grams of the dry mixture of this Example II is mixed in a beaker with about 5 cc. of water, and the contents of the beaker emptied into the bottle over the seeds as in Example I. The seeds are then processed as in Example I.

EXAMPLE IV

A liquid premix containing both zinc trichlorophenate and potassium gibberellate for use in treating seed is described below, using the following materials in the amounts indicated:

| | |
|---|---|
| Zinc trichlorophenate grams | 27.5 |
| Potassium gibberellate do | 1.0 |
| FD&C Green No. 1 do | 0.05 |
| Methyl alcohol cc | 130 |
| Xylene cc | 90 |

The potassium gibberellate and the dye are dissolved in about 40 cc. of the methyl alcohol. This is added to a solution of zinc trichlorophenate in xylene and the remaining methyl alcohol, which is then stirred.

To treat 2 pounds of seed to produce an effect on the number of resulting seedlings similar to the effect produced by the dry premix used for seed lot No. 4 of Example I, 4.6 cc. of this liquid premix is poured into a gallon bottle, stirred around, and then the seeds poured into the bottle and the bottle shaken and rolled until all the liquid is taken up by the seeds. The seeds are then processed as in Example I.

In regard to the infra-red spectrum for potassium gibberellate set forth in detail in Example I, it is to be noted that other solid forms of potassium gibberellate may show departures from the spectrum described, such departures, however, being only significant of a change in the physical state of the solid but not of the molecular structure.

What is claimed is:

1. A method for treating cotton seeds to improve the number of seedlings resulting therefrom, comprising treating the cotton seeds, before they are planted and before they sprout, with a mixture of a gibberellin and a zinc-containing fungicide.

2. The method of claim 1 in which the zinc containing fungicide is zinc trichlorophenate.

3. A method for treating cotton seeds to improve the number of seedlings resulting therefrom, comprising treating the cotton seeds, before they are planted, with a mixture of potassium gibberellate and a zinc-containing fungicide.

4. The method of claim 3 in which the zinc-containing fungicide is zinc trichlorophenate.

5. A composition for treating cotton seeds to improve the number of seedlings resulting therefrom, comprising a mixture of a gibberellin, a zinc-containing fungicide, and an inert carrier.

6. A composition for treating cotton seeds to improve the number of seedlings resulting therefrom, comprising a mixture of potassium gibberellate, zinc trichlorophenate, and an inert carrier.

References Cited in the file of this patent

UNITED STATES PATENTS

| | | |
|---|---|---|
| 1,938,585 | Estabrooke | Dec. 12, 1933 |
| 2,204,213 | Grace | June 11, 1940 |
| 2,258,291 | Jones | Oct. 7, 1941 |
| 2,314,091 | Jones | Mar. 16, 1943 |
| 2,339,335 | Heckmanns | Jan. 18, 1944 |
| 2,502,809 | Vogelsang | Apr. 4, 1950 |
| 2,842,051 | Brian | July 8, 1958 |
| 2,849,835 | Huff | Sept. 2, 1958 |

FOREIGN PATENTS

| | | |
|---|---|---|
| 696,177 | Germany | Sept. 13, 1940 |

OTHER REFERENCES

Publication: Yabuta et al., "Biochemical Studies on Bakanae Fungus. Part 15, Effect of Gibberellin and Heteroauxin on Rice Seedlings (1)." Journal of Agricultural Chemical Society of Japan, volume 19, No. 4, pages 244 through 248, published 1943.

Publication: Miller, "Study Seed Protectants on Peanuts," published June 1950, in "Agricultural Chemicals (magazine), volume 5, No. 6, pages 59, 61, 63, 91.

Publication: Kemp, "Gibberellic Acid" published April 1957, in Agricultural Chemicals (magazine), volume 12, No. 4, pages 30 and 31.